Oct. 16, 1962  F. HOFFMANN  3,058,367
COLLAPSIBLE STEERING COLUMN, ESPECIALLY FOR MOTOR VEHICLES
Filed Nov. 6, 1959
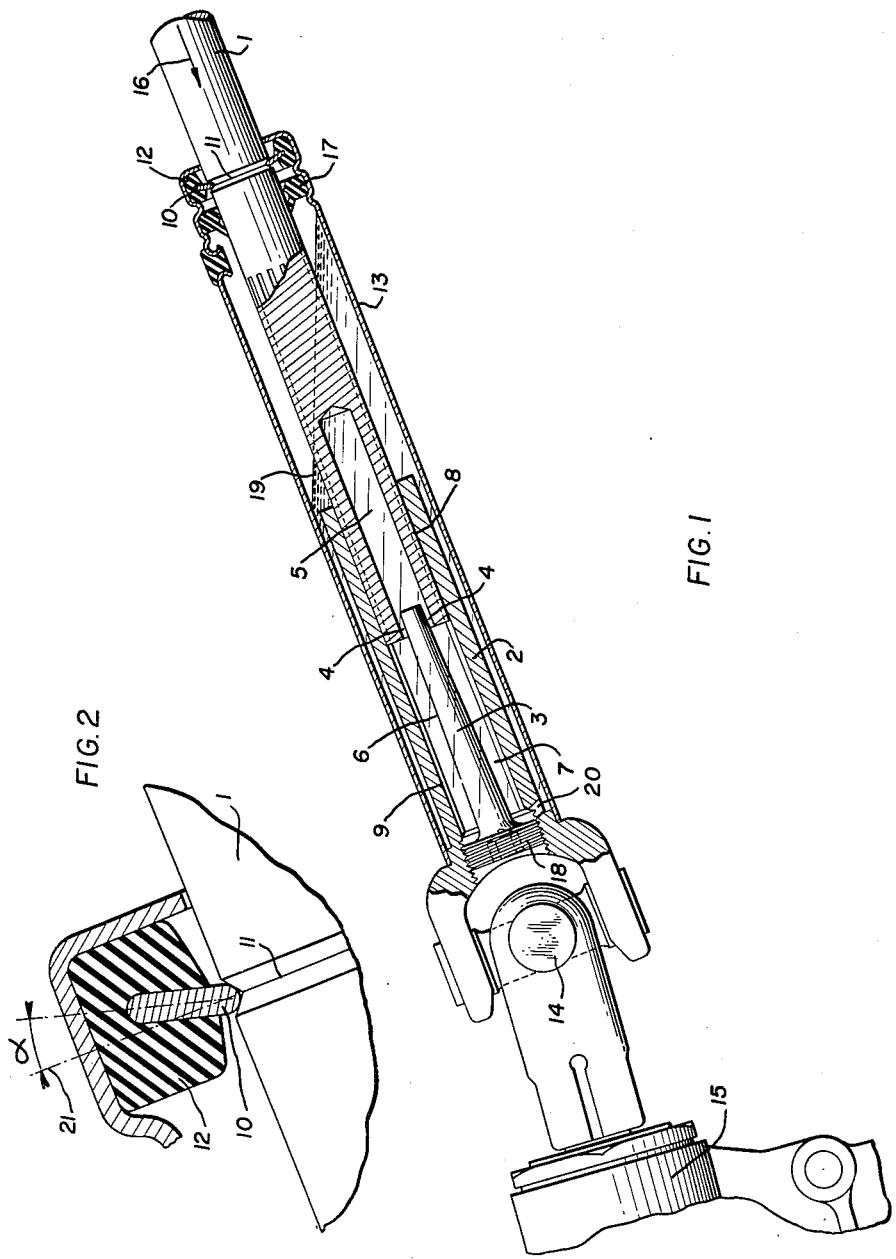
INVENTOR.
FRIEDRICH HOFFMANN
BY Dicke, Craig and Freudenberg
ATTORNEYS 3,058,367
COLLAPSIBLE STEERING COLUMN, ESPECIALLY
FOR MOTOR VEHICLES
Friedrich Hoffmann, Stuttgart-Bad Cannstatt, Germany, assignor to Daimler-Benz Aktiengesellschaft, Stuttgart-Unterturkheim, Germany
Filed Nov. 6, 1959, Ser. No. 851,272
Claims priority, application Germany Nov. 13, 1958
13 Claims. (Cl. 74—493)

The present invention relates to a collapsible steering column which is hydraulically spring-supported, and in which the damping due to the residual and compressed oil remaining in the cylinder and compressed therein increases linearly or progressively.

The present invention is based on the known problem to provide for the driver, especially of passenger motor vehicles, an increased impact protection which is to become effective, in particular, during accidents and collisions, especially in head-on collisions or accidents when the vehcle runs accidentally against an obstacle, for instance, when hitting a tree, a wall, a column or the like.

Collapsible steering columns are already known in the prior art which are equipped either with spiral springs or with a hydraulic installation for purposes of absorbing shocks.

The present invention aims at a simplification of the spring and damping installation with respect to manufacture thereof and to achieve simultaneously optimum damping characteristics therefor. Furthermore, the hydraulically spring-supported steering column in accordance with the present invention is to be independent of the position of the steering housing or steering casing and is to be such as to be provided with its own supply of hydraulic medium, such as oil.

The steering column in accordance with the present invention is characterized essentially by the presence of a plunger piston member provided with either a conically-shaped or curved outer surface configuration which, upon the occurrence of a relatively strong spring force or in case of a relatively large shock, penetrates through a calibrated orifice or nozzle into the closed cylinder space filled with hydraulic medium, such as oil, thereupon seeks to compress the oil and forces the same through the last-mentioned orifice or nozzle.

In one yielding steering column construction of the prior art which is guided in a hollow worm of the steering gear, provided with a plurality of apertures or bores disposed one behind the other, these bores are valved successively by the displacement piston in case of the collapse of the steering column, i.e., in case the steering column undergoes a slidable displacement in the direction to shorten its length, whereby the discharge cross-section formed by these apertures for the compressed and expelled oil is continuously decreased.

With the construction according to the present invention, the decrease of the outlet cross-section is to be achieved preferably by the particular construction and configuration of the plunger piston provided with a conically-shaped or curved outer contour which enters into the cylinder filled with oil in such a manner that with an increasing collapsing movement of the steering column, the annularly-shaped discharge cross-section for the oil left within the area of the nozzle cross-section by the immerged piston member becomes increasingly smaller.

In the steering column according to the present invention, two parts are provided adapted to slide at least partly one into the other, whereby one part thereof includes the plunger piston and the other part the cylinder for the plunger piston.

According to another feature of the present invention, the two parts of the steering column adapted to slide one into the other may be provided with axial bores over the region of the mutual sliding movement thereof, in particular, the bore of the lower part adjacent to the steering gear housing may receive the upper part of the steering column and the bore of the upper part may serve for purposes of accommodating therein the plunger piston. The lower end of the upper steering column part which is constructed as cylinder for the plunger piston is appropriately provided along the outer wall thereof with an external spline configuration that engages with a complementary internal spline configuration of the lower part constructed also as cylinder.

For purposes of stopping or positively halting the steering column in the axial direction thereof, several arrangements have already been proposed in the prior art. It is proposed in one known prior art arrangement to provide at the steering column a toothed rack with inclined teeth, stepped or set off with respect to each other into which engages a springy member that permits a displacement of the toothed rack and therewith of the steering column in one direction, while preventing any movement of the steering column in the opposite direction. In another known prior art installation, a springy clamping member is provided which surrounds the steering column and cooperates with grooves or notches arranged at the steering column, which, in turn, are so constructed that a displacement of the steering column in one direction is possible whereas such displacement is precluded in the opposite direction.

According to still another feature of the present invention, it is proposed, for purposes of positively stopping or halting the steering column, to provide an annular disk-shaped member, preferably of split construction, and stationary in the axial direction, which engages into an annular groove of the upper part of the steering column.

For purposes of rendering the aforementioned annular disk member stationary, the annular disk member may be supported in an annular-shaped rubber bearing or support which is retained by a sleeve member preferably made of sheet metal parts, which, in turn, is rigidly connected with the lower part of the steering column and thereby tightly seals the lower part of the steering column as well the the lower end of the upper part of the steering column toward the outside thereof. The annularly-shaped stopping disk member itself may be constructed so as to be of conical shape, of semi-spherical shape, of cap shape, or the like, and/or subdivided into several sectors.

A completely satisfactory and reliable stopping of the steering column devoid of any play is assured by the particular construction of the collapsible hydraulically spring-supported steering column in accordance with the present invention, and, in particular, by the utilized rubber elements thereof.

By reason of the fact that the annular stopping disk member is inclined from the radial direction thereof with respect to the steering column in the direction toward the driver, as viewed in a radial cross-section, any spring movements of the steering column in the upward direction toward the driver is prevented, whereas a relatively much smaller resistance is opposed to the spring movement of the steering column in the opposite, downward direction away from the driver, i.e., in the collapsing direction of the steering column tending to shorten the same.

The entire manufacture and assembly of the steering column is greatly simplified by the particular construction of the steering column in accordance with the present invention, especially by the use of the aforementioned sleeve member, since no accurate fitting is necessary for the sheet metal parts utilized in connection therewith.

Accordingly, it is an object of the present invention to provide a hydraulically spring-supported steering column which is simple in manufacture, which may be readily assembled and which is very reliable and effective in operation to protect the driver.

Another object of the present invention is the provision of a reliable and simple shock absorber construction for a collapsible steering column supporting thereon the steering wheel, in which the desired, optimum damping characteristics may be readily achieved.

Still another object of the present invention resides in the provision of a collapsible steering wheel construction which assures increased protection to the driver of the vehicle.

Another object of the present invention is the provision of a hydraulically-operated shock absorber arrangement for a collapsible steering column mechanism which is completely independent of the position of the steering gear and has its own supply of hydraulic damping medium.

A still further object of the present invention resides in the provision of a hydraulic plunger piston arrangement to absorb hydraulically any shocks and which is so arranged and constructed as to make readily possible the attainment of optimum damping characteristics.

Still another object of the present invention resides in the provision of a hydraulic shock absorber arrangement for a collapsible steering mechanism together with a reliable, simple and relatively inexpensive stopping arrangement for the steering column.

These and other objects, features and advantages of the present invention will become more obvious from the following description when taken in connection with the accompanying drawing, which shows, for purposes of illustration only, one embodiment in accordance with the present invention, and wherein:

FIGURE 1 is a cross-sectional view through the lower region of the steering column and illustrating also in part the steering gear housing, and FIGURE 2 is an enlarged partial cross-sectional view through the upper region of the steering column in accordance with the present invention.

Referring now to the drawing, wherein like reference numerals are used throughout the various views to designate corresponding parts, and more particularly to FIGURE 1 thereof, the upper part of the collapsible steering column is designated therein with reference numeral 1, and the lower part thereof with reference numeral 2. The lower part of the steering column 2 is provided with the plunger piston member 3 constructed according to the present invention, which enters through a calibrated nozzle or an orifice 4 into an enclosed cylinder 5 filled with oil in case of a sudden shock or impact on the steering column.

The plunger piston member 3 is provided with an outer surface configuration 6 having either a conically-shaped or a curved axial cross-sectional contour, and is so constructed that in case of collision the hydraulic damping increases either linearly or progressively. The damping characteristic is thereby determined, on the one hand, by the entire outer surface 6 of the plunger piston member 3, and, on the other, by the calibrated nozzle 4.

As may be clearly seen from FIGURE 1, the two parts 1 and 2 of the steering column which are adapted to slide one into the other are provided with bores 5 and 7 which extend essentially over the entire area of the two parts 1 and 2 affected by the mutual collapsing movement thereof. The bores 5 and 7 thereby extend in the axial direction of the steering column. The bore 7 of the lower part 2 thereby receives the lower end of the part 1. In case of an extremely strong shock, the plunger piston member 3 which is disposed within the bore 7 penetrates into the bore 5 of the lower end of part 1. The lower end of part 1 is provided along the outer side thereof with an external splined configuration 8 which engages with the internal splined configuration 9 of complementary shape provided in the walls of bore 7.

For purposes of halting the steering column during normal driving operation of the vehicle, a disk member 10 is provided which, in the illustrated embodiment, has a conical shape at the inner end thereof. The annular disk member 10 is preferably of split construction and engages in a groove 11 provided in the upper part 1 of the steering column. The annular disk member 10 is supported in a rubber bearing member 12 also of annular shape. The rubber bearing member 12, however, may also be omitted or may be replaced by similar, analogous elements.

A sleeve 13 made of sheet metal is provided within the region of the collapsing movement of the parts 1 and 2, which sleeve 13 seals off the lower region of the entire steering column toward the outside thereof. The sleeve 13 is rigidly connected with the lower end of the lower part 2 of the steering column. Consequently, the annular disk member 10 is also rigidly connected with the lower part 2. The steering gear housing or casing 15 is connected for universal movement with the lower part 2 by means of a universal joint 14 of known construction. Relatively small shocks are, therefore, transmitted without damping from the steering gear housing 15 over the part 2, the sleeve 13, to the part 1 of the steering column. Consequently, the hydraulic protective shock absorption is effectively bypassed thereby. If, however, a relatively strong shock exceeds a predetermined magnitude or intensity, then the upper part 1 slides forwardly in the direction of the arrow 16 into the sleeve 13, whereupon the plunger piston member 3 enters into the cylinder 5 and effectuates an ever-increasing damping which, as already mentioned hereinabove, depends on the outer surface configuration 6 of the plunger piston member 3. The spring force which is required to force the annular disk member 10 out of the groove 11 is dependent on the shape of the annular disk member 10 and essentially on the position of the profile or cross-section of the annular disk member 10 with respect to the radial direction of the steering column, as viewed in a radial cross-sectional view. The spring force is the smaller, the more tha annular disk member 10 is inclined out of the radial direction of the steering column in the direction toward the steering wheel.

The position of the profile of the annular disk member 10 with respect to the radial direction of the steering column as used in the illustrated embodiment is particularly clearly visible from FIGURE 2. In FIGURE 2, the dashed line 21 designates the radial direction of the steering column. The angle α designates therein the inclination of the annular disk member 10 with respect to the radial direction 21. The spring force in the direction 16 necessary to release the sliding movement of the steering column 1 is the smaller, and the spring force necessary to enable movement of the steering column 1 in a direction opposite to the arrow 16 beyond the position illustrated in FIGURE 1, the larger, the larger the angle α. The same, of course, is true only for a predetermined limited range of the angle α.

For purposes of additionally sealing the steering column illustrated in FIGURE 1, there is provided a seal 17 within the upper area of the sleeve 13 and a sealing member 18 which is threadably clamped in place at the base of the plunger member 3. Reference numeral 19 designates the approximate position of the oil level during normal position of the two parts 1 and 2, i.e., in the normal operating position of the steering wheel and column. Reference numeral 20 designates a bore for the return flow of the oil during inward spring movements, i.e., during movements of part 1 in the direction of arrow 16 in case of collision or shocks.

In place of the bore 20 for the return flow of the oil, at least one tooth may be omitted within the toothed spline connection 8, 9, either of the lower part 2 or of the upper part 1 so that an upwardly extending channel for the return flow of the oil during inward spring movements is formed thereby. With this last-mentioned construction, the sheet metal sleve 13 may be constructed of considerably shorter dimension and is appropriately rolled onto the lower part 2 with the simultaneous clamping of the rubber ring 18, which then assumes the function of oil seal.

While I have shown and described one embodiment in accordance with the present invention, it is understood that the same is not limited thereto but is susceptible of many changes and modifications within the spirit and scope of the present invention, and I, therefore, do not wish to be limited to the details shown and described herein, but intend to cover all such changes and modifications as are encompassed by the scope of the appended claims.

I claim:

1. A hydraulically spring-supported, collapsible steering column assembly comprising a steering rod having an upper part and a lower part, means for securing said two parts together for simultaneous rotation thereof, said two parts being adapted to slide in the direction toward each other and one within the other and being provided with axial bores within the area of the mutual sliding movement thereof, one of said parts being provided with a cylinder space formed by one of said bores filled with a hydraulic medium and provided with aperture means at one end thereof forming a nozzle of predetermined configuration, the other part slidingly receiving said one part in the axial bore thereof and including solid plunger piston means of non-uniform cross section in successive planes taken along the axis thereof essentially at right angle with respect thereto and adapted to enter into said cylinder space through said aperture means during the occurrence of a relatively strong shock on the steering column and cooperating with said calibrated nozzle in such a manner as to provide a predetermined gradual damping of said shock by means of said hydraulic medium which is increasingly compressed and forced out of said cylinder through said nozzle with said plunger piston means entering into said cylinder space while the cross sectional discharge area formed between said aperture means and said plunger piston means decreases, and reservoir means for storing said hydraulic medium when the same is forced out of said cylinder.

2. A hydraulically spring-supported, collapsible steering column assembly according to claim 1, further comprising a stering gear housing, the other part being the lower part and being secured to said casing, said one part being the upper part and the bore thereof receiving said plunger piston means.

3. A hydraulically spring-supported, collapsible steering column assembly according to claim 1, wherein said one part forms the upper part of the steering column and said other part forms the lower part of the steering assembly, and wherein said means for securing said two parts together comprises a spline configuration provided along the outer walls of said one part and a complementary spline configuration provided along the walls of the bore thereof receiving said one part.

4. A hydraulically spring-supported, collapsible steering column assembly comprising a steering rod having a first relatively stationary part and a second part, said second part being adapted to slide in the direction toward the first part and one within the other, one of said parts being provided with a cylinder space filled with a hydraulic medium and provided with aperture means at one end thereof forming a nozzle of predetermined configuration, the other part including solid plunger piston means having a non-uniform external surface configuration and adapted to enter into said cylinder space through said aperture means during the occurrence of a relatively strong shock on the steering column and cooperating with said calibrated nozzle in such a manner as to provide a predetermined gradual damping of said shock by said hydraulic medium which is compressed and forced out of said cylinder through said nozzle with said plunger piston means entering into said cylinder space, reservoir means for storing said hydraulic medium when the same is forced out of said cylinder, and stop means including groove means in said second part and an annularly-shaped stop disk member supported relatively stationary in the axial direction of said steering column and adapted to engage in said groove means to positively stop said second part in the axial movements relative to said first part in a predetermined position thereof.

5. A hydraulically spring-supported, collapsible steering column assembly according to claim 4, wherein said stop means further comprises elastic bearing means for supporting said stop disk member, said first part constituting the lower part of the steering column, and a sheet metal sleeve member retaining therein said elastic bearing means and surrounding said first and second parts, said sleeve member being rigidly connected with the lower end of said first part and effectively sealing the lower part of the steering column as well as the lower end of said second part toward the outside thereof to thereby form said reservoir means.

6. A hydraulically spring-supported, collapsible steering column assembly according to claim 4, wherein said stop disk member is supported in said elastic bearing means inclined with respect to the radial direction of said steering column as viewed in a radial cross-sectional view thereof.

7. A hydraulically spring-supported, collapsible steering column assembly, comprising a steering rod having a first part and a second part, said two parts being adapted to slide in the direction toward each other and one within the other and being provided with axial bores within the area of the mutual sliding movement thereof, one of said parts being provided with a cylinder space formed by one of said bores filled with a hydraulic medium and provided with aperture means at one end thereof, said aperture means being so constructed and arranged as to form a nozzle of predetermined configuration, the other part slidingly receiving said one part in the axial bore thereof and including solid plunger piston means of non-uniform cross section in successive planes taken along the axis thereof essentially at right angle with respect thereto, said plunger piston means being adapted to enter into said cylinder space through said aperture means during the occurrence of a relatively strong shock on the steering column and to cooperate with said calibrated nozzle in such a manner as to provide a predetermined gradual damping of said shock by means of said hydraulic medium which is increasingly compressed and forced out of said cylinder through said nozzle with said plunger piston means entering into said cylinder space while the cross-sectional discharge area formed between said aperture means and said plunger piston means decreases, reservoir means for storing said hydraulic medium when the same is forced out of said cylinder, and stop means so construced and arranged as to normally positively stop said second part in the axial movement relative to said first part in a predetermined position thereof and to allow said relative axial movement upon the exertion of a relatively strong shock exceeding a predetermined intensity.

8. A hydraulically spring-supported, collapsible steering column assembly as defined in claim 7, wherein said second part is provided with groove means, and wherein said stop means includes an annularly-shaped stop disk member supported adjacent said groove means, said stop disk member being relatively stationary in the axial direction of said steering column and adapted to engage in said groove means, said stop disk member being inclined with respect to the radial direction of said steering column as viewed in a radial cross-sectional view thereof.

9. A hydraulically spring-supported, collapsible steering column assembly according to claim 8, wherein said first part constitutes the lower part of the steering assembly, and wherein said stop means further includes elastic bearing means for supporting said stop disk member and a sleeve member supporting therein said elastic bearing means together with said stop disk member adjacent said groove means, said sleeve member surrounding said first and second parts and being rigidly connected with the lower ends of said first part and effectively sealing the lower part of the steering column assembly as well as the lower end of said second part toward the outside thereof to thereby form an enclosed chamber, said chamber constituting said reservoir means for storing said hydraulic medium when the same is forced out of said cylinder, and means operatively interconnecting said chamber with the axial bore of said other part.

10. A hydraulically spring-supported, collapsible steering column assembly according to claim 9, wherein said connecting means is a bore provided in the end of said other part opposite the end of the axial bore into which said one part enters.

11. A hydraulically spring-supported, collapsible steering column assembly according to claim 9, wherein said first and second parts are provided with spline teeth along the mutual sliding surfaces thereof and wherein said connecting means is formed by the omission of one of said teeth for the return flow of the oil.

12. A hydraulic brake device for use in a collapsible steering column assembly comprising a steering rod having a first part and a second part, said two parts being adapted to slide in the direction toward each other and one within the other and being provided with axial bores within the area of the mutual sliding movement thereof, one of said parts being provided with a cylinder space formed by one of said bores filled with a hydraulic medium and provided with aperture means at one end thereof forming a nozzle of predetermined configuration, the other part slidingly receiving said one part in the axial bore thereof and including solid plunger piston means of non-uniform cross section in successive planes taken along the axis thereof essentially at a right angle with respect thereto and adapted to enter into said cylinder space through said aperture means during the occurrence of a relatively strong shock on one of said parts and cooperating with said calibrated nozzle in such a manner as to provide a predetermined gradual dampening of said shock by means of said hydraulic medium which is increasingly compressed and forced out of said cylinder through said nozzle with said plunger piston means entering into said cylinder space while the cross sectional discharge area formed between said aperture means and said plunger piston means decreases, and reservoir means for storing said hydraulic medium when the same is forced out of said cylinder.

13. In a hydraulically spring-supported, collapsible steering column assembly comprising a steering rod having an upper part and a lower part, said two parts being adapted to slide in the direction toward each other, the improvement comprising stop means for supporting said two parts with respect to each other so constructed and arranged as to normally positively stop the sliding movements of said two parts relative to each other in a predetermined position thereof and to allow said relative sliding movement upon the exertion on the steering column of a relatively strong shock exceeding a predetermined intensity, said stop means comprising groove means in said upper part, an annularly-shaped stop disk member adapted to engage into said groove means, and means for supporting said stop disk member relatively stationary in the axial direction of said steering column assembly including elastic bearing means for normally holding said stop disk member in a position to positively stop the sliding movements of said two parts relative to each other in a predetermined position thereof, said elastic bearing means allowing said relative sliding movement upon the exertion of a relatively strong shock exceeding a predetermined magnitude against the steering column assembly, said stop disk member being supported by said elastic bearing means inclined with respect to the radial direction of said steering column as viewed in a radial cross-sectional view thereof, and hydraulic brake means acting on said two parts to provide a predetermined gradual dampening of the sliding movement of said two parts relative to each other when the same occurs.

References Cited in the file of this patent

UNITED STATES PATENTS

| | | |
|---|---|---|
| 1,072,350 | Muller | Sept. 2, 1913 |
| 1,794,981 | Philpott et al. | Mar. 3, 1931 |
| 2,055,250 | Colclough | Sept. 22, 1936 |
| 2,227,821 | Burrell | Jan. 7, 1941 |
| 2,511,165 | Lyman | June 13, 1950 |
| 2,549,345 | Tamboli | Apr. 17, 1951 |
| 2,716,355 | Schmid | Aug. 30, 1955 |
| 2,922,316 | Schmid | Jan. 26, 1960 |